(12) United States Patent
Dilz et al.

(10) Patent No.: US 6,232,873 B1
(45) Date of Patent: May 15, 2001

(54) METHOD AND APPARATUS FOR SIGNALLING THEFT FOR A MOTOR VEHICLE

(75) Inventors: Bernhardt Dilz, Sindelfingen; Dietbert Kollbach, Esslkingen; Peter Robitschko, Sindelfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/960,202

(22) Filed: Oct. 29, 1997

(30) Foreign Application Priority Data

Oct. 29, 1996 (DE) .............................. 196 44 879

(51) Int. Cl.$^7$ ................................................ B60R 25/10
(52) U.S. Cl. ...................... 340/426; 340/425.5; 340/429; 340/430; 340/438; 340/440; 340/522; 340/526; 340/529; 307/10.2
(58) Field of Search ................................. 340/425.5, 426, 340/428, 429, 430, 438, 440, 941, 517, 522, 526, 527, 528, 529, 507; 116/33; 307/10.2; 180/287

(56) References Cited

U.S. PATENT DOCUMENTS 5,181,010 * 1/1993 Chick .................................... 340/426

FOREIGN PATENT DOCUMENTS

| | | |
|---|---|---|
| 39 26 983 A1 | 2/1991 | (DE) . |
| 42 03 865 A1 | 3/1993 | (DE) . |
| 42 43 415 C1 | 4/1994 | (DE) . |
| 44 16 118 C1 | 10/1995 | (DE) . |
| 0 366 378 B1 | 10/1989 | (EP) . |
| 0 388 756 A2 | 3/1990 | (EP) . |
| 0 641 693 A1 | 3/1994 | (EP) . |
| 2 523 340 | of 1982 | (FR) . |
| 2 012 092 | of 1979 | (GB) . |
| 2 246 860 | of 1990 | (JP) . |
| WO 93/24911 | 12/1993 | (WO) . |

* cited by examiner

Primary Examiner—Daryl Pope
(74) Attorney, Agent, or Firm—Evenson, McKeown, Edwards & Lenahan, P.L.L.C.

(57) ABSTRACT

In a failsafe method and apparatus for signalling theft for a motor vehicle, an item of theft-signalling information is produced as a function of the signal state of at least one of a plurality of monitoring signals, which are indicative of vehicle states. According to the invention, the theft-signalling information is produced only if the signal states of a plurality of monitoring signals are present in one of one or more prescribed theft-signalling combinations. Each theft-signalling combination comprises one or more signalling conditions, which succeed one another in a specific time sequence and which signalling conditions themselves comprise one or more theft indicative combinations of jointly interrogated signal states of associated monitoring signals.

11 Claims, 3 Drawing Sheets

METHOD AND APPARATUS FOR SIGNALLING THEFT FOR A MOTOR VEHICLE

BACKGROUND AND SUMMARY OF THE INVENTION

This application claims the priority of German patent document 196 44 879.4, the disclosure of which is expressly incorporated by reference herein.

The invention relates to a method and apparatus for signalling theft for a motor vehicle, in which an item of theft-signalling information is produced as a function of the signal state of at least one of a plurality of signals which are output by corresponding vehicle-state monitoring means.

As used herein, theft is to be understood as including not only to unauthorized taking of the vehicle, but also an unauthorized attempt to enter the vehicle. The term vehicle-state monitoring means refers to the components on the vehicle which output signals that supply information on the current state of the vehicle. These include in particular sensors for detecting unauthorized tampering with an unauthorized access protection device (for example a central locking system), and/or an unauthorized use protection device (for example an electronic immobilizer), and vehicle components which produce signals relating to the operation of the vehicle, such as an ignition line signal, a fuel pump signal, signals from wheel rpm sensors etc.

Methods and devices of this kind are customary in a variety of forms for modern motor vehicles. The theft-signalling information produced when an attempted theft is detected usually triggers an alarm system arranged on the vehicle. There are also systems already known in which the theft-signalling information is transmitted (preferably in addition to triggering an alarm signal on the vehicle) via a wireless signal transmission link to a monitoring point outside the vehicle, in order to initiate suitable measures against the attempted theft from said point. For example, an electronic immobilizer and/or pursuit of a vehicle by means of an appropriate locating system, may be triggered. Such systems are disclosed, for example, in German patent documents DE 39 26 983 A1, DE 42 03 865 A1, EP 0 388 756 A2 and WO 93/24911 as well as the patent documents EP 0 366 378 B1 and DE 42 43 415 C1. In addition, these publications describe various vehicle-state monitoring means, of which preferably a plurality are provided in each case, in order to monitor the vehicle both in terms of attempted break-ins and in terms of attempts at driving it away and/or transporting it away.

In all the systems described in these publications, the theft-signalling information is produced if the signals which are indicative of vehicle states indicate an attempted theft, for example an attempt at break-in, an attempt at driving away or an attempt at transporting away. In such cases, the theft-signalling information triggers the vehicle alarm, and is simultaneously passed on via the wireless transmission link to the remote monitoring point. The malfunction of one of the vehicle-state monitoring means, which leads to incorrect production of the theft-detecting signal state for the respective signal, thus undesirably results in the monitoring point incorrectly concluding that a theft is occurring and initiating the appropriate countermeasures. There is therefore need for improvement of the reliability of the theft-detection means.

In a theft alarm system described in the European patent document EP 0 641 693 A1, selective activation and deactivation of various system components is possible. In addition, specific time delays are provided for the transmission of sensor signals relating to theft, in order to facilitate the transmission of data over a combined transmission channel without data collisions and to be able to perform operations, in the time periods thus provided, for proving an authorized vehicle access or an authorized vehicle use. Such time periods for proving the use authorization are also provided with a method for releasing an activated electronic immobilizer, which method is described in patent DE 44 16 118 C1.

The object of the present invention is to provide a method and apparatus of the type mentioned above, which makes it possible to signal thefts in a way which is comparatively protected against incorrect alarms, in particular, when necessary, also for signalling theft to a monitoring point which is arranged spatially remote from the vehicle.

This object is achieved by the method and apparatus according to the invention, in which theft-signalling information is produced only if the signal states of a plurality of signals which are indicative of vehicle states are present in one of one or more prescribed theft-signalling combinations. Each such theft-signalling combination comprises one or more signalling conditions, which succeed one another in a specific time sequence and which themselves comprise one or more combinations, which are indicative of theft, of jointly interrogated signal states of the signals which are indicative of vehicle states.

In this way, a theft is signalled only when the appropriate signal states of a plurality of signals which are indicative of theft occur in a correct simultaneous combination and/or in a correct time sequence. If only one signal which is indicative of a vehicle state assumes its signal state which is indicative of theft, this does not lead to a theft being signalled, and the system in question is consequently failsafe with respect to single faults. In addition, multiple faults do not necessarily lead to a theft being incorrectly signalled; rather only in the highly improbable case in which, as a result, one of the prescribed theft-signalling combinations is randomly produced. In addition, since the simultaneous occurrence of a plurality of signal faults is itself relatively improbable, the result is that the method and device according to the invention permit very reliable, failsafe signalling of thefts.

One embodiment of the invention makes it possible to signal a theft situation in which, after towing away or entering the vehicle without authorization, an attempt is being made to activate said vehicle without authorization by bypassing an electronic immobilizer by replacing at least one control unit (for example the engine control unit) which relates to the operation of the vehicle with an external control unit.

Another embodiment of the invention is particularly suitable for detecting a theft situation in which an unauthorized attempt is being made t6 appropriate the vehicle by loading it onto another vehicle and transporting it away. Similarly, still another embodiment is particularly suitable for detecting an unauthorized attempt is to appropriate the vehicle by towing it away.

Other objects, advantages and novel features of the present invention will become apparent from the following detailed description of the invention when considered in conjunction with the accompanying drawings.

DETAILED DESCRIPTION OF THE DRAWINGS

Figure 1:
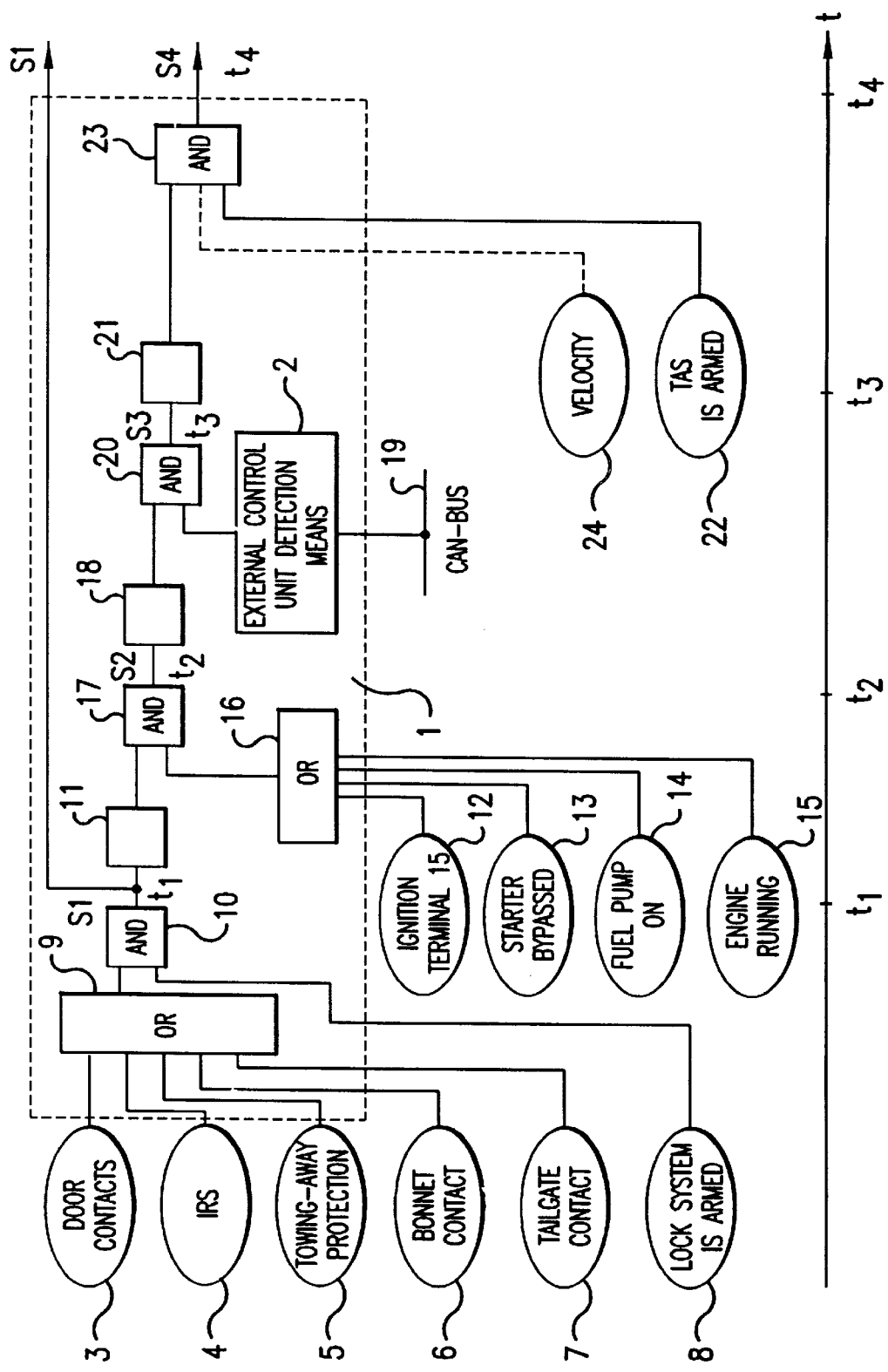
FIG. 1 shows a schematic block diagram of a device for failsafe signalling of attempted theft of a motor vehicle using an external control unit.
Figure 2:
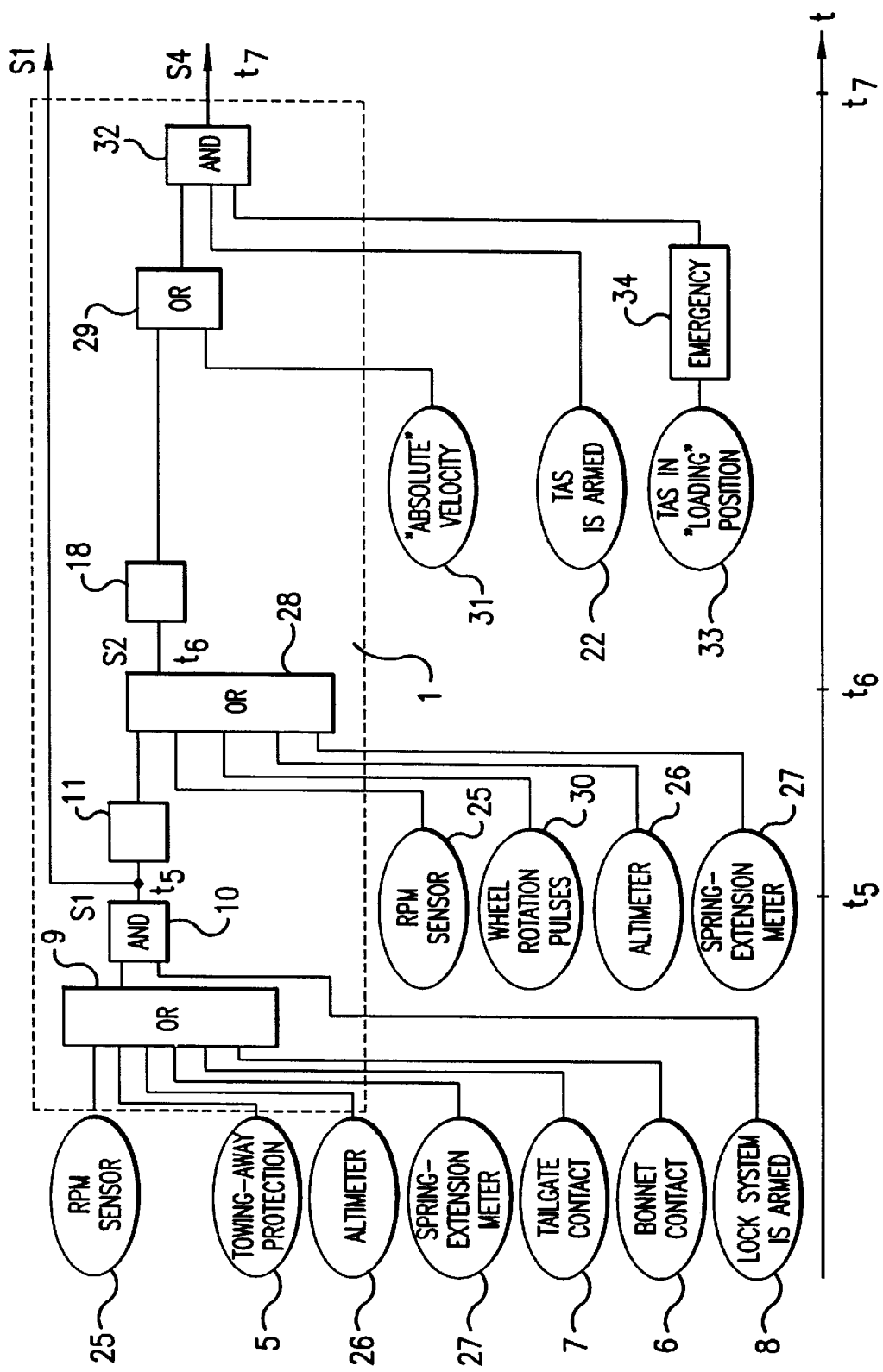
FIG. 2 shows a schematic block diagram of a device for failsafe signalling of attempted theft of a motor vehicle by loading it onto another vehicle and transporting it away.
Figure 3:
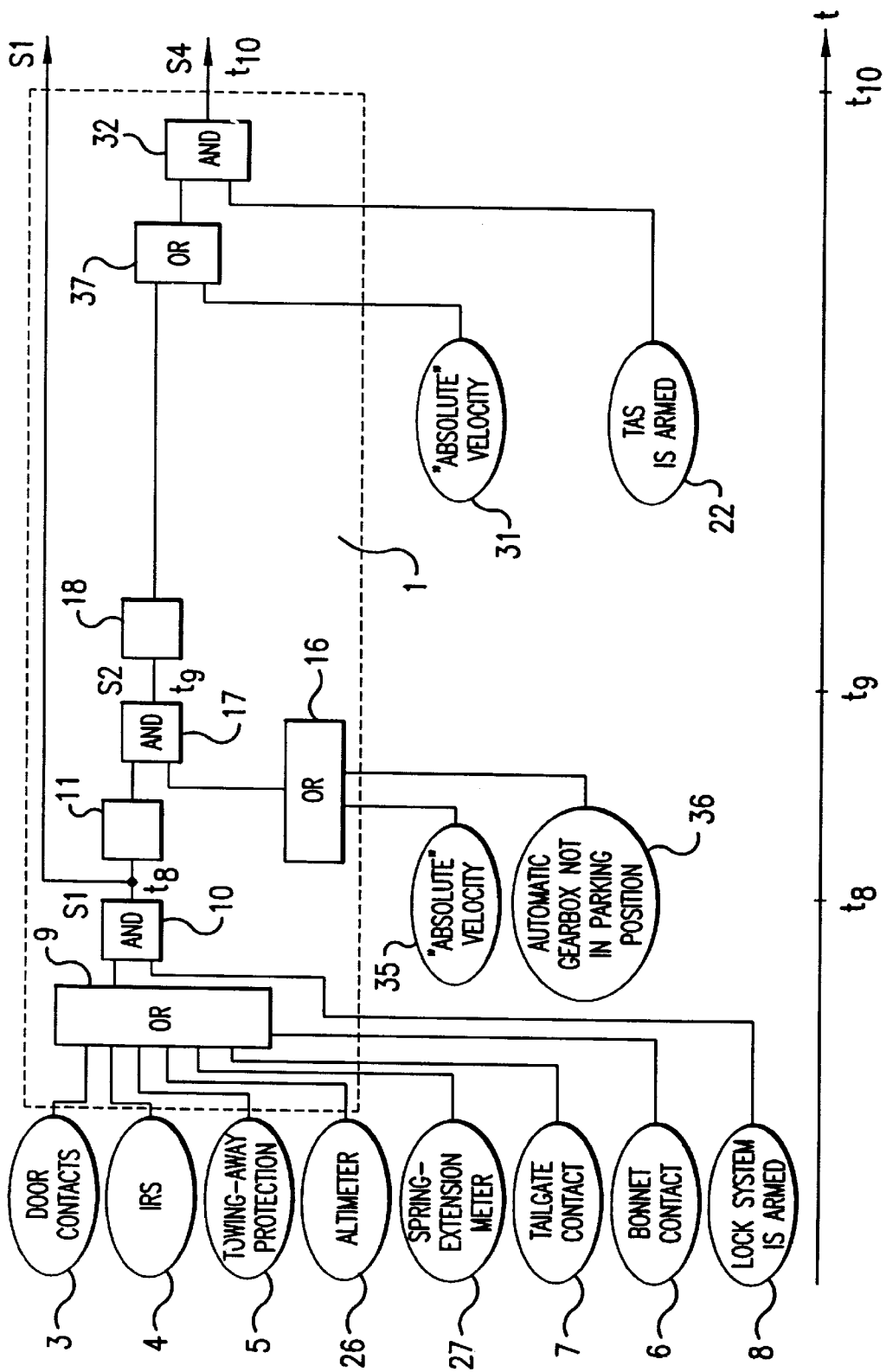
FIG. 3 shows a schematic block diagram of a device for failsafe signalling of attempted theft of a motor vehicle by towing it away.

The devices illustrated in FIGS. 1 to 3 perform failsafe signalling of different situations where theft is attempted. It is of course possible to implement only one device, or any desired combination of the three devices, in a particular motor vehicle. Preferably, all three illustrated devices are implemented as parts of a combined device which can detect all types of attempted thefts. In this respect, FIGS. 1 to 3 should be regarded as various aspects of one and the same device.

In FIGS. 1 to 3, the hatched function block which is surrounded by a dashed line represents an arithmetic unit 1 with various interfaces for receiving input signals 3–8, 12–15 and 24–25. In the simplest case, the input interfaces comprise digital interfaces at which a respective signal which indicates vehicle states is present, with a digital signal state which indicates that a possible attempt at theft is, or is not, taking place. For example, the signals from door contact sensors 3 indicate whether the respective vehicle door is being opened, or is closed. In other cases, complex interfaces are provided, for example for detecting an external control unit. For the latter purpose, an external-use protection system (also referred to as travel-authorization system) which is present exchanges with the respective control unit, an encrypted message, which is decoded and assessed for correctness.

Via a first signal output $S_1$, the arithmetic unit 1 outputs an alarm signal which can trigger a theft alarm system on the vehicle. Via a second output $S_4$, the arithmetic unit 1 outputs a theft-signalling signal, which can be transmitted via a wireless long-distance transmission link to a remote monitoring location which carries out appropriate locating and/or immobilization measures of a conventional type when an attempted theft is signalled.

The devices illustrated according to FIGS. 1 to 3 are capable of detecting the theft scenarios which are still most relevant because of the use of electronic immobilizers (which virtually exclude the possibility of stealing a vehicle on its own axle without possessing original keys). Such theft scenarios include bypassing or removal of vehicle control units which relate to operation (in particular the engine control unit) loading the vehicle onto another vehicle and transporting it away, or towing it away.

For evaluating signals, the arithmetic unit 1 contains various logic AND and OR elements and $\Delta t$ time delay elements. In this context, the terms logic AND and OR elements refer not only to simple logic combinations of a plurality of digital signals, but also to logic combinations at a higher level of abstraction. For example, in FIG. 1, the external control unit detection means 2 interrogatres and decodes an encrypted dialogue between the engine control unit and the external use protection system, to detect whether the original control unit is no longer active (and therefore whether it has been replaced by an external control unit). This complex interrogation procedure then results in the digital information "external control unit present" or not.

The $\Delta t$ delay elements are, in the first instance, not customary delay elements, but rather the symbolic representation of the chronological occurrence of the respective signals. The logic combination elements and the $\Delta t$ delay elements can be realized not only as hardware, but also to a certain extent as software in the arithmetic unit 1. When necessary, the logic combination elements and the $\Delta t$ delay elements can also be replaced by fuzzy logic, threshold logic, which outputs an item of theft-signalling information starting from a prescribed probability threshold of, for example, greater than 98%, then being located at the end of the decision chain.

In FIGS. 1–3, the oval function blocks outside the arithmetic unit 1 represent various vehicle state-monitoring units which are ordinarily present on a vehicle. Each such monitoring unit outputs to the arithmetic unit 1 a signal which is indicative of a vehicle state. In addition to a contact-controlled outer skin protection sensor system 3, 6, 7, which monitors the closed state of the various outer skin elements of the vehicle that are capable of opening (e.g., vehicle doors, hood and tailgate), and a passenger compartment protection sensor 4 (for example an ultrasonic monitoring unit and a conventional towing-away protection 5), the prescribed protection sensor system also includes (as shown in FIG. 2) a movement sensor, which contains an rpm sensor system 25, an acceleration sensor system, a wheel rotation pulse evaluation unit 30 (for example of an anti-locking system and/or an intelligent combinatorial unit for assessing the respective individual signals) which unit can be implemented, for example, by means of electronic arithmetic circuits and/or a microcontroller. Furthermore, the vehicle position can be monitored by means of a locating system 31, for example using a GPS receiver, and hence the absolute vehicle velocity in space can also be monitored.

Below, details are given on the functions of the devices in accordance with FIGS. 1 to 3, in which the components which relate to each specific functionality are arranged along a straight time line t, to symbolize the time sequence of successive signalling conditions which are a precondition for the production of the theft-signalling signal S4.

The device of FIG. 1 detects an attempt to break into the vehicle or to tow it away and then activate it using one or more external control units in order to bypass the electronic immobilizer. Initially, the arithmetic unit 1 senses, as a first signalling condition, whether the vehicle is being towed away or broken into when the vehicle access protection device is activated, i.e. the lock system is armed. For this purpose, the output signals of a door contact sensor system 3, of a passenger compartment protection system 4, of a towing-away protection 5, of a bonnet contact 6 and of a tailgate contact 7 are sensed and input to an OR gate 9 in the arithmetic unit 1. The output from gate 9 is input to an AND gate 10, together with a signal representing the state of the lock system 8. As a result, at a time $t_1$ a first signalling-condition signal S1 is generated, which indicates an attempted theft if the lock system was activated and at least one of the OR-combined signals of the units 3 to 7 (indicative of access to the vehicle) also has a signal state which is indicative of theft.

This first signalling-condition signal is used directly as an alarm-triggering signal S1 which triggers the alarm system on the vehicle, since improved protection against faults is not absolutely necessary for this triggering of the alarm. Because the state of the lock system 8 is taken into account via this AND combination 10, the alarm signal S1 cannot be produced when the vehicle doors are opened with authorization. In addition, the arithmetic unit 1 detects possible removal of the lock system 8 and then also produces the alarm signal S1. If the lock system 8 cannot be deactivated owing to a technical defect, but is to be replaced, to permit this it is possible, for example, to transmit an appropriate message to the monitoring point which then permits the vehicle to be towed away to a workshop.

In a subsequent time period, illustrated by an appropriate Δt delay element 11, it is interrogated whether an attempt is being made to activate the vehicle. For this purpose the operating state of ignition line 12, a starter line 13, the fuel pump 14 and the vehicle engine 15 are interrogated. The four associated signals which are indicative of vehicle states are input to an OR gate 16 in the arithmetic unit 1, and the resulting signal is then input to an AND gate 17, together with the (delayed) first signalling-condition signal S1, so that an appropriate second signalling-condition signal S2 is generated at a time $t_2$. The Δt delay elements here generally also have storage properties so that, for example, after an attempt at breaking into the vehicle the second signalling-condition signal S2 retains its signal state which is indicative of theft, even if a vehicle door which has previously been forced open has already been closed again.

In a subsequent time period, symbolized again by an appropriate Δt delay element 18, the arithmetic unit 1 tests whether an external control unit, for example an external engine control unit, has been installed without permission. For this purpose, the arithmetic unit 1 samples the data bus line 19 (which is for example, of a CAN bus present in the vehicle), between the appropriate control unit which is involved in the electronic immobilization protection and the travel-authorization system itself, for the encrypted authorization data exchanged between the latter. In this manner, it is determined whether the original control unit (or an authorized replacement control unit) has been replaced by an unauthorized external control unit. For example, a replacement engine control unit which has been installed with authorization is conventionally adapted by means of a transportable hand-held testing unit, and behaves identically to the previous original engine control unit.

In the unlikely event that the travel-authorization system fails in its activated (armed) state, the exchange can be carried out in a workshop after the vehicle has been towed away. Such towing away can be indicated to the monitoring point in a special signalling mode, so that the latter then permits the towing-away procedure without evaluating it as an attempted theft.

The digital signal from the external control unit detection unit 2, which contains the information indicating whether at least one external control unit has been used, is then input to an AND gate 20 with the second signalling-condition signal S2, resulting in a third signalling-condition signal S3 at a time $t_3$.

In a subsequent time period, again symbolized by an appropriate Δt delay element 21, the arithmetic unit 1 then checks whether the travel-authorization system 22 is activated or, at any rate, was activated before the installation of an external control unit. The appropriate information signal is subjected to an AND operation 23 with the third signalling-condition signal S3. The resulting signal represents the theft-signalling signal S4 which is output by the arithmetic unit 1 at a time $t_4$ and which is passed on via a wireless transmission link to the central monitoring point (not illustrated) outside the vehicle. The theft-signalling signal S4 is clearly provided with extremely effective failsafe protection, since it indicates an attempt at theft only if the signal states of the various abovementioned vehicle state signals input to the arithmetic unit 1 are present in quite specific theft-signalling combinations, such as are characterized by the OR and the AND operations and by the correct time sequence, as symbolized by the various Δt delay elements.

Individual incorrect triggerings of signals lead, at the most, to the production of the signal S1 for the activation of an alarm on the vehicle, but not to signalling of an attempt at theft to the remote monitoring point, which initiates the more far-reaching locating and vehicle immobilization measures when a theft situation is reported. To further increase failsafe protection of the associated theft-signalling signal S4, the signal of a vehicle speed sensor system 24 can also be taken into account, as indicated by broken lines in FIG. 1, for the last AND combination which makes this signal S4 available. In this case, the theft-signalling information S4 is produced only when the vehicle is moving at a specific minimum speed.

In order to faciliate servicing work by authorized service personnel without triggering a false theft signal S4, where necessary a service key may be provided which is handed out to the authorized personnel and which is detected by the arithmetic unit 1 after it has been inserted into the ignition lock. The arithmetic unit 1 is then able to suppress the transmission of this signal S4 or, together with this signal S4, output an item of additional information with which the monitoring point can detect that the manipulation on the vehicle is authorized.

FIG. 2 shows a failsafe device for signalling the unauthorized loading and transporting away of a vehicle on another vehicle as an attempted theft. (Components which are functionally identical components to those of FIG. 1, have identical reference symbols.) As stated previously, the two devices may also be integrated to form a combined device.

In FIG. 2, the state signal of the lock system 8 is combined in the AND gate 10 with the output signal of the OR gate 9 to produce the first signalling-condition signal S1 at a time $t_5$. The signals of an rpm sensor system 25, the towing-away protection 5, an altimeter 26, a spring-extension meter 27 as well as of the tailgate contact 7 and the bonnet contact 6, which are indicative of vehicle states, are fed to the OR gate 9. If one of these OR conditions is fulfilled when the lock system 8 is armed, the first signalling-condition signal S1 indicates a theft, which triggers the vehicle alarm. In this case, the first signalling-condition S1 specifically indicates a vehicle-loading procedure.

In the subsequent time period, symbolized by the Δt delay element 11, the first signal S1 is combined in an OR operation 28 with the signals of the rpm sensor system 25, a wheel rpm sensor system 30, the altimeter 26 and the spring-extension meter 27. The four last-mentioned signals serve to detect the loading of the vehicle onto another vehicle. The second signal S2 results from this OR combination 28 at a time $t_6$.

In the subsequent time period, symbolized by the Δt delay element 18, the second signal S2 is subjected to an OR gate 29 with the output signal of a GPS receiver 31, which contains information on the absolute vehicle velocity in space. By virtue of the OR operation 29, a theft is signalled if the absolute velocity exceeds a prescribed minimum velocity. The result of the OR gate 29 is then input to an AND gate 32, together with two further signals at a time t7 in order to produce the theft indicating signal S4. One of the two further signals indicates the state of the travel-authorization system 22, and the other indicates whether the travel-authorization system 22 is in a loading operating mode 33. This operating mode is provided for the travel-authorization system 22 in order to permit authorized transport of the vehicle by rail or ship without triggering the theft-signalling signal S4. The state signal which is associated with the loading operating mode 33 is inverted in an inverter 34 before being fed to the AND operation 32.

The device shown in FIG. 3 can be implemented separately, or as a further component of the devices of FIG. 1 and/or 2. The arrangement of FIG. 3 detects attempted thefts by a towing-away. Functionally identical components to those in devices 1 and 2 have the same reference symbols, and for their explanation the description in FIGS. 1 and 2 can be referred to. In FIG. 3, the signals of the door contacts 3 of the passenger compartment protection 4, the towing-away protection 5, the altimeter 26, the spring-extension meter 27, the tailgate contact 7 and the bonnet contact 6 are input to an OR operator 9 of the arithmetic unit 1, in order to detect whether the vehicle has been broken into and/or whether someone is moving in the passenger compartment of the vehicle and/or the vehicle has been lifted up. By a subsequent AND combination 10 of the resulting OR signal with the state signal of the lock system 8, the first signalling-condition signal S1 is then produced at a time $t_8$, which signal is indicative of theft and triggers the alarm on the vehicle.

In the time period after the first signalling-condition signal S1 has been produced, symbolized by the $\Delta t$ delay element 11, the first signalling-condition signal S1 of the AND operation 17 is combined with the output signal in the OR operation 16. In this case, the state signal of a handbrake 35 is OR-combined with the state signal of an automatic gearbox 36. In this context, a towing-away procedure is indicated by the handbrake being released and/or the automatic gearbox being moved out of its parking position.

At a time $t_9$, the AND operation 17 produces the second signalling-condition signal S2 which, in the subsequent time period, symbolized by the $\Delta t$ delay element 18, is then subjected to an OR operation 37 with the absolute movement signal of the GPS receiver 31, in order to cause a theft to be signalled when the signal state which is indicative of theft occurs for at least one of these two signals. The signal resulting from the OR operation 37 is then logically combined in the subsequent AND operation 32 with the state signal of the travel-authorization system 22 at a time $t_{10}$, in order to produce the theft-signalling signal S4.

The above description of the three devices (which preferably represent different aspects of a combined device), makes it clear that according to the invention, the theft-signalling information which is preferably transmitted to a remote monitoring point is produced in a very failsafe fashion.

It is evident that, in addition to the specifically shown and described theft-signalling combinations which lead to the production of the theft-signalling information, it is also possible, depending on the application, to use only some of these signals and/or further signals (not shown here) which relate to vehicle security and/or other combinations of the shown logical signal combinations and modified time sequences of the individual signalling-condition signals, in order to produce the theft-signalling information in a failsafe fashion. If appropriate, the signal which triggers the alarm on the vehicle may be produced in a failsafe fashion by using, for example, the illustrated theft-signalling signal S4 instead of the first signalling-condition signal S1 to trigger the alarm on the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for signalling theft for a motor vehicle, in which an item of theft signalling information is produced as a function of a signal state of at least one of a plurality of signals which are indicative of vehicle states, wherein:

the theft-signalling information is produced only if signal states of a plurality of signals which are indicative of vehicle states are present in a theft-signalling combination; and said theft signalling combination comprises signalling conditions which succeed one another in a specific time sequence, and which signalling conditions themselves comprise one or more theft indicative combinations of jointly interrogated signal states of associated signals which are indicative of vehicle states.

2. The method according to claim 1, wherein the theft-signalling information is produced if:

a theft indicative signal state of a door contact sensor system, a passenger compartment protection sensor system, a towing-away protection sensor system, a hood-position sensor system or a tailgate-position sensor system is present when the lock system is armed;

thereafter a theft indicative state of an ignition line, a starter line, a switched-on fuel pump or of a running engine is present;

thereafter a theft indicative signal state of an external control unit detection means is present; and thereafter an armed travel-authorization system is verified and optionally the vehicle's exceeding a prescribed minimum velocity by the vehicle is detected.

3. Method according to claim 1, wherein the theft-signalling information is produced if:

a theft indicative signal state of an rpm sensor system, a towing-away protection sensor system, an altimeter, a spring extension meter, a tailgate-position sensor system or a hood-position sensor system is present when the lock system is armed; or thereafter a theft indicative signal state of the rpm sensor system, a wheel rpm sensor system, the altimeter or the spring-extension meter is present; and a vehicle travel-authorization system is armed and is not in a loading operating mode.

4. Method according to claim 1, wherein the theft-signalling information is produced if:

an absolute vehicle velocity exceeds a prescribed minimum value; and a vehicle travel-authorization system is armed and is not in a loading operating mode.

5. Method according to claim 1, wherein the theft-signalling information is generated if a theft indicative signal state of a door contact sensor system, a passenger compartment protection sensor system, a towing-away protection sensor system, an altimeter, a spring extension meter, a tailgate-position sensor system or a hood-position sensor system is present when the lock system is armed;

thereafter, a theft indicative signal state relating to a released handbrake or an automatic gearbox which has been moved out of its parking position is present; and a vehicle travel-authorization system is armed.

6. Method according to claim 1, wherein the theft-signalling information is generated if a theft indicative signal state of a door contact sensor system, a passenger compartment protection sensor system, a towing-away protection sensor system, an altimeter, a spring extension meter, a tailgate-position sensor system or a hood-position sensor system is present when the lock system is armed;

absolute vehicle velocity exceeds a prescribed minimum velocity; and a vehicle travel-authorization system is armed.

7. A device for signalling theft for a motor vehicle, comprising:

a plurality of vehicle-state monitoring units which generate monitoring signals that are indicative of vehicle states; and an arithmetic unit which produces an item of theft-signalling information as a function of the signal state of at least one of the monitoring signals; wherein:

the arithmetic unit is configured to produce theft-signalling information only if signalling states of a plurality of monitoring signals are present in a theft-signalling combination; and said theft-signalling combination comprises signalling conditions which succeed one another in a specific time sequence, and which signalling conditions themselves each comprise at least one combination of jointly interrogated signal states of associated monitoring signals.

8. A method of detecting theft of a motor vehicle, comprising:

sensing a plurality of vehicle parameters and generating sensing signals which are indicative of states of systems of said vehicle;

detecting an occurrence of preset combinations of selected states of said sensing signals; and generating a theft indicative signal in response to time sequential occurrence of a plurality of said combinations, in a predetermined order.

9. Apparatus for detecting a theft of a vehicle, said apparatus comprising:

a plurality of sensors which monitor vehicle parameters and generate sensor signals indicative of states thereof; and a control unit coupled to receive said sensor signals as inputs thereto;

wherein said control unit detects an occurrence of preset combinations of selected states of said sensor signals, and generates a theft indicative signal in response to time sequential occurrence of a plurality of said combinations, in a predetermined order.

10. Apparatus according to claim 9, wherein said control unit comprises logic gates for detecting said preset combinations of selected states of said sensor signals.

11. Apparatus according to claim 9, wherein said control unit comprises a digital data processor for detecting occurrence of said preset combinations of selected states of said sensor signals.

* * * * *